No. 654,551. Patented July 24, 1900.
R. LUNDELL.
MEANS FOR REGULATING ELECTRIC MOTORS.
(Application filed May 19, 1900.)
(No Model.)
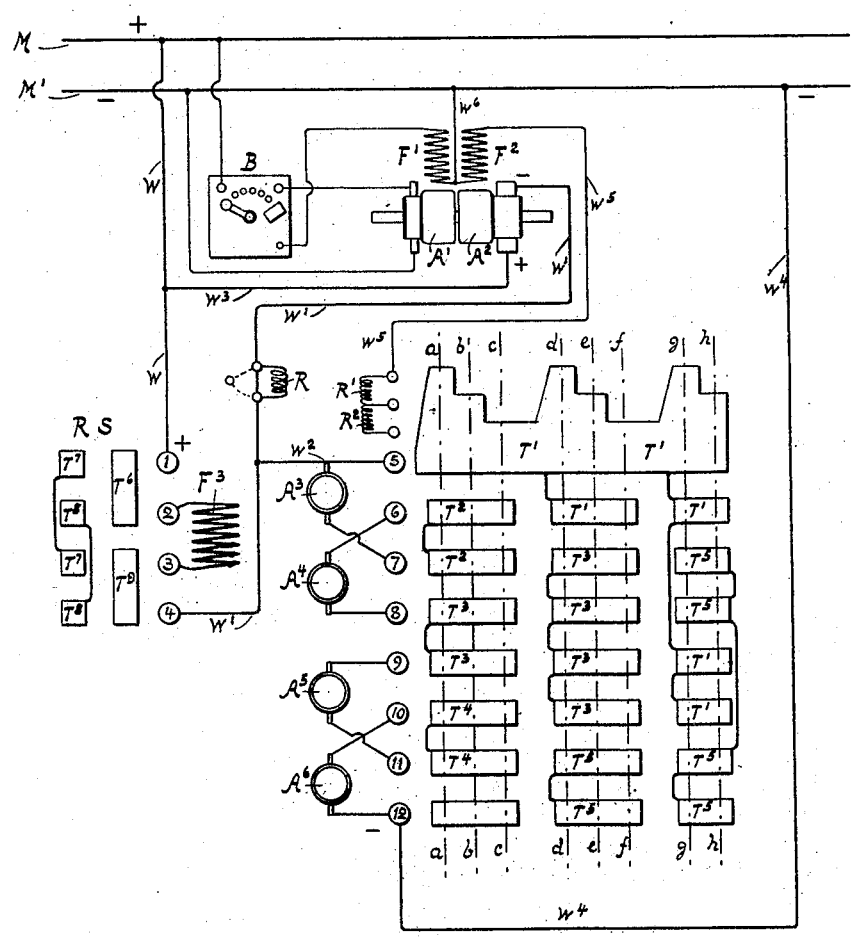
Witnesses
M. F. Keating
N. Grandin
Inventor
Robert Lundell
By his Attorney
Charles J. Kintner

United States Patent Office.

ROBERT LUNDELL, OF NEW YORK, N. Y.

MEANS FOR REGULATING ELECTRIC MOTORS.

SPECIFICATION forming part of Letters Patent No. 654,551, dated July 24, 1900.

Application filed May 19, 1900. Serial No. 17,254. (No model.)

*To all whom it may concern:*

Be it known that I, ROBERT LUNDELL, a citizen of the United States, residing at New York, borough of Manhattan, in the county of New York and State of New York, have made a new and useful Invention in Means for Regulating Electric Motors, of which the following is a specification.

My invention is directed particularly to the regulation of electric motors of the series-parallel type and is designed to accomplish the same results as are attained in the practice of the methods and by the use of the means described and claimed in a prior patent, No. 626,178, granted to me on the 30th day of May, 1899, and also to accomplish additional results of importance, as will be hereinafter disclosed, the essentially-novel points of the invention being particularly pointed out in the claims at the end of this specification.

The invention has for its objects, first, to devise means for controlling series-parallel motors by varying the field strength and by coupling the armature-circuits in series-parallel combinations in the manner hereinafter described; second, to provide means whereby all external resistance in series with the armature-circuits can be dispensed with, particularly when the current changes from series to parallel are being effected; third, to so arrange the field and armature-circuits that for the lower speed combinations the motors may automatically return current to the line and at the same time act as brakes, making mechanical braking unnecessary, except for minimum speeds; fourth, to eliminate sparking at the brushes; fifth, to reduce the apparatus to a simple commercial form and at the same time increase its efficiency to a higher degree than was possible with the means disclosed in my prior patent; sixth, to reduce the sparking at the controller-contacts to a minimum, and, seventh, to make the motors capable of running at a great variety of fixed speeds, which speeds can be materially varied without rewinding the motors.

As stated in my prior patent, it is customary to employ resistances in the armature-circuits of motors which are coupled in series-parallel combinations for the purpose of avoiding too-sudden variations in speed, sparking at the brushes, and excessive flashing at the controller-contacts. These resistances are particularly necessary while the change from series to parallel is being effected. There are, however, serious objections to all armature-resistances, the chief objections being loss of efficiency and uneven drops of voltage between the resistance-terminals due to variations in the load. In fact the resistances are only correct for one particular load upon the motors, as a light load will cause too small a drop of voltage in the resistance itself and a heavy load will cause a greater drop of voltage than is required for correct variations in speed.

For a clear understanding of the invention, such as will enable others skilled in the art to construct and use the same, reference is had to the accompanying drawing, which is a diagrammatic view illustrating two or more series-parallel motors and the application of my invention for effecting the regulation thereof.

$A'$ and $A^2$ represent the two armatures in a small motor-generator, the capacity of which approximates seventy-five per cent. of the maximum watt losses in the field-windings of all the motors which are to be coupled in series parallel. $F'$ and $F^2$ are the respective shunt-field windings of said motor-generator.

B is a starting-box for the motor-generator, connected in a well-known manner to two current-mains M and M', which I will suppose are connected to a large five-hundred-volt power generator. (Not shown.)

$A^3$, $A^4$, $A^5$, and $A^6$ represent armature-circuits of four motors with single-wound armatures or two motors each with a double-wound armature, it being immaterial which case is assumed. However, these armature-circuits belong to the motors, the speed of which is to be governed. $F^3$ represents all of the series field-windings of these various motors, which windings I will assume are all coupled permanently in series, the two ends being connected as shown on the drawing.

Numbers 1 to 12, &c., represent stationary controller-contacts, contacts 1 to 4, inclusive, belonging to the reversing-switch RS, and the others 5 to 12, &c., belonging to the main rotary switch.

$T'$ to $T^9$ represent the movable contacts on the main switch and on the reversing-switch, said contacts being shown in plan development. They are supposed to be mounted on a cylindrical controller-cylinder in the usual way. Like letters denote contacts which are or can be connected together electrically.

R is a small resistance of large current capacity, which is usually short-circuited, as shown, and R' R² are field-regulating resistances for the generator side of the motor-generator, which are cut in or out of circuit by the main (controller) switch, as shown in the drawings.

$w$ $w'$ to $w^6$ are conductors to which reference will be made in explaining the mode of operation.

The dotted lines $a\,a$ to $h\,h$ indicate the various steps or notches on the main (controller) switch or the positions thereof.

It will be noted on inspection of the drawing that the armature-terminals (or brushes) on the generator side of the motor-generator are connected by conductors $w^3$ $w$ $w'$ to the two contacts 1 and 4, which in turn may be connected through the movable contacts in the reversing-switch RS to the terminals 2 and 3 of the field-windings $F^3$. Conductor $w^3$ is also connected through conductor $w$ to the positive main M and the polarity of the motor-generator is so arranged when running that the armature-terminal connected to conductor $w^3$ will likewise be positive. The armature $A^2$ of the motor-generator should be so wound that when its field-magnet $F^2$ is fully charged the voltage and ampere capacity of the armature should be sufficient to give the normal excitation to the various field-windings represented by $F^3$. For example, if the total resistance of all the field-coils in series is one-half ohm and the current required for normal or full excitation of $F^3$ is sixty amperes it follows that the electromotive force of $A^2$ should be thirty volts with full field. It will of course be understood that if the field-magnet $F^2$ is weakened to such an extent (by the field-resistances R' and R²) that the voltage at the armature-terminals of $A^2$ is reduced to one-half it follows that the excitation of the field-windings $F^3$ will also be only one-half of the normals—in other words, the rate of excitation of $F^3$ will vary according to the voltage of $A^2$. This will even be true when current is flowing from the main M through conductor $w$ and field-coils $F^3$, &c., and through the armature-windings $A^3$, $A^4$, $A^5$, and $A^6$ to the negative main M', provided, however, that the internal ohmic resistance of armature $A^2$ is small or negligible as compared with the ohmic resistance of $F^3$. In other words, the field-windings $F^3$ will receive their excitation almost as if they were separately excited, which (being true) makes the various speeds as governed by the position of the controller nearly independent of the load. In order to make the speeds less independent of the load, it is only necessary to increase the ohmic resistance in the circuit leading from armature $A^2$ by adding an auxiliary resistance R, which can be adjusted to suit existing conditions.

Referring now to the various armature-circuits $A^3$ $A^4$ $A^5$ $A^6$ of the main motors, which are connected to the stationary contacts on the main switch in the simple manner shown, it will be noticed that the upper contact 5 is connected by conductor $w^2$ to an armature-terminal of $A^3$ and to the previously-mentioned conductor $w'$, the lower contact 12 being connected to the negative main by conductor $w^4$. It will thus be evident that before any current from the positive main M can pass through the main armature-circuits it must first pass through the field-windings $F^3$ and through armature $A^2$ if the counter electromotive force of the latter is low.

Supposing now that the reversing-switch RS is closed, so that contacts $T^6$ and $T^9$ establish connection from 1 to 2 and from 3 to 4, respectively, and that the motor-generator is running, we are then ready to observe the operation of the entire apparatus as the main switch is moved to the first position, (indicated by line $a\,a$,) and so on until the last position, (indicated by line $h\,h$.) The first position $a\,a$ (first speed) connects all four armature-circuits $A^3$, $A^4$, $A^5$, and $A^6$ in series and the field-magnet $F^2$ of the motor-generator is given its highest excitation by reason of the two resistances R' and R² being cut out. In this position (first speed) the current flowing from the positive main M is small and the armature $A^2$ is supplying the principal portion of the strong currents for the field-windings $F^3$. The second position $b\,b$ (second speed) leaves the main armature-circuits in series, as before; but the field strength of $F^2$ has been reduced by a suitable resistance R', which in turn has reduced the electromotive force of $A^2$ and the current flowing through field-windings $F^3$ by an amount sufficient to give the desired increase in speed. Third position $c\,c$ (third speed) further weakens the field-windings and further increases the speed in the manner just described. This has been accomplished by cutting in the resistance R², which is so adjusted that the speed becomes sufficiently near to the speed which corresponds to the next position $d\,d$, (fourth speed.) This position $d\,d$ has coupled the armature-circuits $A^3$ $A^4$ $A^5$ $A^6$ in series parallel, as will be found by following the connections, and the fields $F^2$ and $F^3$ have again been fully charged by reason of the resistances R' and R² being short-circuited. In this position there is of course more current flowing from the main M through the armatures $A^3$, $A^4$, $A^5$, and $A^6$ than when the same were all in series. Owing to the strength of this current the armature $A^2$ will not be required to furnish as much current to the field-windings $F^3$ as in the first position of the main switch. Fifth position $e\,e$ (fifth speed) and sixth position $f\,f$ (sixth speed) leave the armature connections as in fourth position $d\,d$, but the field-currents through F² and F³ have been reduced, as described before, and the speed of the motors has been correspondingly increased. Seventh position $g\,g$ (seventh speed) couples all of the armatures A³, A⁴, A⁵, and A⁶ in parallel, and the current flowing from the main M is now greater than ever; in fact, strong enough to give to the field-windings F³ more than is needed for full excitation, causing a rise of potential between binding-posts 1 and 4, which in turn causes the armature A² to take part (the surplus) of the current. Eighth position $h\,h$ (eighth speed) increases the speed by allowing a still greater part of the current from the main M to flow through the armature A². It is not considered advisable to further weaken the field-windings F³ on account of possible sparking at the brushes in this last combination of armature-circuits when there is full electromotive force for each armature. I have assumed all this time that the counter electromotive force of A² has kept the current flowing through F³ at strictly-determined rates dependent only on the field strength of F², and it follows, of course, that should the controller be moved from the position of highest speed to any of the lower speeds an immediate reduction of speed must follow. Should the inertia of the revolving armatures and of the apparatus they are driving cause the speed to be considerably higher than the correct speed for a given position of the controller, the armatures will then act as generators, driving current back into the mains and causing the same effect as if mechanical brakes were temporarily applied. The smaller the ohmic resistances of the armatures A′, A², A³, A⁴, A⁵, and A⁶ are, the more exact is any speed as determined by the position of the controller. Should it be advisable, for instance, in a certain class of railway-work to slightly alter this characteristic of the motors, so as to cause them to act after the manner of ordinary series-wound motors, this can be done by simply cutting in the small resistance R. Should it be necessary to make a permanent change in speed—for example, if higher speeds should be deemed advisable—this can be accomplished by increasing the resistances R′ and R² and by adding a permanent resistance in the circuit represented by conductor $w^5$.

I do not limit my invention to the specific arrangement of circuits and circuit connections and apparatus hereinbefore described, and illustrated in the accompanying drawing, for effecting the regulation of one or more series-parallel electric motors when combined with a motor-generator and for effecting all of the results hereinbefore referred to, as I believe it is broadly new with me to so combine such an apparatus, and my claims are to be construed as of the most generic nature.

Having thus described my invention, what I claim, and desire to secure by Letters Patent of the United States, is—

1. The combination of a pair of current-mains of constant electromotive force, one or more motors having armature-circuits capable of being coupled in series parallel; a source of variable electromotive force adapted to vary the field strength and speed of said motor or motors independent of their armature-currents, with a controlling-switch having circuit connections between the current-mains, the motor or motors and the source of variable electromotive force.

2. One or more motors having armature-circuits capable of being connected in series parallel; in combination with a source of variable electromotive force connected in shunt across the field-windings of said motor or motors for the purposes described.

3. One or more motors having armature-circuits capable of being connected in series parallel; in combination with a motor-generator connected to the field-windings of said motor or motors and adapted to vary the field strength thereof, independent of the armature-currents.

4. A motor-generator having its generator-armature connected in shunt with the field-windings of one or more motors; in combination with means for changing the electromotive force of the motor-generator for the purpose of varying the field strength and speed of said motor or motors.

5. The combination of one or more series-parallel motors with a motor-generator and one or more resistances for varying the current-supply from the generator side of the motor-generator to the motor or motors.

In testimony whereof I have hereunto subscribed my name this 18th day of May, 1900.

ROBERT LUNDELL.

Witnesses:
C. J. KINTNER,
M. F. KEATING.